US010167372B2

(12) United States Patent
Garancher

(10) Patent No.: US 10,167,372 B2
(45) Date of Patent: Jan. 1, 2019

(54) MANUFACTURE OF POLYLACTIC ACID FOAMS USING LIQUID CARBON DIOXIDE

(71) Applicant: Jean-Philippe Paul Marie Pierre Garancher, Rotorua (NZ)

(72) Inventor: Jean-Philippe Paul Marie Pierre Garancher, Rotorua (NZ)

(73) Assignee: BIOPOLYMER NETWORK LIMITED, Rotorua (NZ)

( * ) Notice: Subject to any disclaimer, the term of this patent is extended or adjusted under 35 U.S.C. 154(b) by 0 days.

(21) Appl. No.: 15/641,988

(22) Filed: Jul. 5, 2017

(65) Prior Publication Data

US 2018/0148559 A1  May 31, 2018

Related U.S. Application Data

(63) Continuation of application No. 14/426,320, filed as application No. PCT/IB2013/058296 on Sep. 5, 2013.

(60) Provisional application No. 61/697,029, filed on Sep. 5, 2012.

(51) Int. Cl.
*C08J 9/12* (2006.01)
*C08J 9/18* (2006.01)
*C08J 9/232* (2006.01)

(52) U.S. Cl.
CPC .............. *C08J 9/18* (2013.01); *C08J 9/122* (2013.01); *C08J 9/232* (2013.01); *C08J 2201/032* (2013.01); *C08J 2203/06* (2013.01); *C08J 2367/04* (2013.01)

(58) Field of Classification Search
CPC ............................ C08J 9/122; C08J 2367/04
See application file for complete search history.

(56) References Cited

U.S. PATENT DOCUMENTS

2010/0029793 A1\* 2/2010 Witt .................. C08J 9/122
521/60
2011/0003133 A1\* 1/2011 Kumar .................. C08J 9/122
428/304.4

FOREIGN PATENT DOCUMENTS

| CN | 1810877 | 8/2006 |
| JP | 2000-136255 | 5/2000 |
| JP | 2000-136261 | 5/2000 |

OTHER PUBLICATIONS

Jean-Philippe Garancher and Alan Fernyhough "Crystallinity effects in polylactic acid-based foams" Journal of Cellular Plastics 48(5) 387-397. 2012. (Year: 2012).\*
Machine translation of JP 2001136255 (Year: 2001).\*
Office Action—European Patent Application EP 13 835 196.0 dated Oct. 2, 2017.
Office Action in Chinese patent application CN 201380050561.6 (English translation).
English machine translation of JP 2000-136261.
English machine translation of JP 2000-136255.
Marubayashi, H. et al, Crystalline Structure and Morphology of Poly(L-lactide) Formed under High-Pressure CO2, Macromolecules 2008 41:9192-9203.

\* cited by examiner

*Primary Examiner* — Michael M Dollinger
*Assistant Examiner* — Christina H Wales
(74) *Attorney, Agent, or Firm* — King & Spalding LLP

(57) ABSTRACT

Methods of producing $CO_2$-impregnated crystallizable polylactic acid resins and expanded polylactic acid foams.

16 Claims, 5 Drawing Sheets

MANUFACTURE OF POLYLACTIC ACID FOAMS USING LIQUID CARBON DIOXIDE

CROSS REFERENCE TO RELATED APPLICATIONS

This application is a continuation of U.S. patent application Ser. No. 14/426,320 filed Mar. 5, 2015 which is a 371 National Phase entry of PCT application PCT/IB2013/058296 field Sep. 5, 2013 which claims the benefit of U.S. provisional patent application 61/697,029 filed Sep. 5, 2012 the contents of which are incorporated by reference in their entirety.

FIELD OF THE INVENTION

The invention relates to methods for producing polylactic acid (PLA) foam products with increased thermal stability properties, the methods comprising use of liquid $CO_2$ impregnation of crystallisable PLA.

BACKGROUND OF THE INVENTION

Polylactic acid is a thermoplastic polyester produced from renewable resources and, because it can be foamed, is a practical alternative to non-renewable polymers for many applications, including packaging applications. Reported disadvantages with polylactic acid-based materials include lower thermal stability properties compared to alternative polymers derived from petrochemicals.

It is an object of the invention to provide improved or alternative foam products and methods for making them.

SUMMARY OF THE INVENTION

Accordingly, the present invention relates to the use of liquid $CO_2$ impregnation, preferably low temperature liquid $CO_2$ impregnation of crystallisable PLA resin to produce PLA foam products having increased heat dimensional stability. The PLA resin may comprise a PLA copolymer, a PLA block copolymer, a PLA homopolymer or a blend of PLA with one or more other polymers.

In one aspect the invention relates to a method of producing $CO_2$-impregnated crystallisable polylactic acid resin, the method comprising
(a) providing a crystallisable polylactic acid resin, preferably comprising less than about 20% crystallinity as determined by differential scanning calorimetry, preferably a resin that has been prepared in an amorphous state, and
(b) contacting the resin with liquid $CO_2$ at a temperature of about −57° C. to about 2° C. to impregnate the resin with $CO_2$.

In another aspect the invention relates to a method of producing polylactic acid foam, the method comprising
(a) providing a crystallisable polylactic acid resin, preferably a resin comprising less than about 20% crystallinity as determined by differential scanning calorimetry, preferably a resin that has been prepared in an amorphous state, that has been impregnated with liquid $CO_2$ at a temperature of about −57° C. to about 2° C. and that comprises up to about 55% by weight $CO_2$, and
(b) expanding the impregnated resin to produce a foam.

A crystallinity of less than about 20% by weight may be determined by differential scanning calorimetry (DSC). In various embodiments, the resin comprises less than about 19, 18, 17, 16, 15, 14, 13, 12, 11, 10, 9, 8, 7, 6, 5, 4, 3, 2, 1% by weight crystallinity, or 0% by weight crystallinity, as determined by differential scanning calorimetry, and useful ranges may be selected between any of these values (for example, about 0 to about 20, about 0 to about 15, about 0 to about 10, or about 0 to about 5%).

In another aspect the invention relates to an expanded PLA foam comprising one or more of a uniform foam cell structure, a density of less than about 200 g/L and a volumetric shrinkage of less than about 35% at 70° C.

$CO_2$ concentration in the polymer is measured by weight according to the following formula $$C = 100 \times \frac{W_{PLA} - W_{PLA-CO2}}{W_{PLA+CO2}}$$

To determine volumetric shrinkage, an exact volume of sample is measured by water displacement and the sample put in an oven at 70° C. for 24 hours. After this thermal treatment, the volume of the sample is re-measured, and the volumetric shrinkage ΔV that was induced by the thermal treatment is calculated as $$\Delta V = 100 \times \frac{V_{initial} - V_{final}}{V_{initial}}$$

The following embodiments may relate to any of the above aspects in any combination.

In one embodiment the foam exhibits a volumetric shrinkage of less than about 35% at 70° C., including less than about 30, 25, 20, 15, 10 or 5% at 70° C., or a shrinkage of about 0% at 70° C., and useful ranges may be selected between any of these values (for example, about 0 to about 35, about 0 to about 20 or about 0 to about 10%).

In one embodiment the foam exhibits linear shrinkage of less than about 5% up to a temperature of about 70° C. when subjected to a compressive force of about 10 kPa. In various embodiments the linear shrinkage is less than about 5, 4.5, 4, 3.5, 3, 2.5, 2, 1.5, 1 or 0.5%, and useful ranges may be selected between any of these values (for example, about 0.5 to about 5%). In various embodiments the temperature is about 70, 72, 75, 77, 80, 82, 85, 87, 90, 92, 95, 97, or 100° C., and useful ranges may be selected between any of these values (for example, about 70 to about 100, or about 75 to about 100° C.).

To determine linear shrinkage, a cylindrical sample is cut from a moulded block and tested in a RSA-G2 DMTA apparatus (TA Instruments). The sample is subjected to a constant 10 kPa compressive stress and heated from room temperature at 2° C. per minute. The linear shrinkage is measured as the deflection of the sample (in % of the initial sample height) throughout the test.

In one embodiment the foam has a density of less than about 5, 10, 20, 30, 40, 50, 60, 70, 80, 90, 100, 110, 120, 130, 140, 150, 160, 170, 180, 190 or 200 g/L and useful ranges may be selected between any of these values (for example, about 20 to about 200, about 30 to about 200, about 20 to about 180, about 30 to about 180, about 20 to about 160, about 30 to about 160, about 20 to about 140, about 30 to about 140, about 20 to about 120, about 30 to about 120, about 20 to about 100 or about 30 to about 100 g/L).

In various embodiments the crystallinity of the expanded resin or foam is at least about 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, or 15% by weight, and useful ranges may be selected between any of these values (for example, about 5 to about 10, about 5 to about 15%).

In one embodiment impregnation is conducted by contacting the resin with liquid $CO_2$, preferably immersing the resin in liquid $CO_2$, preferably until the amount of $CO_2$ adsorbed by the resin is at equilibrium. The amount of $CO_2$ adsorbed by the resin will depend on the nature of the resin and the impregnation time, pressure and temperature. The amount of $CO_2$ adsorbed by the resin at equilibrium may be determined experimentally by determining the maximum amount of $CO_2$ that a selected amount of resin portions, such as resin beads, will adsorb at a desired pressure or temperature. Going to equilibrium results in the $CO_2$ being dispersed evenly throughout the impregnated resin, resulting in more even foaming and more uniform cell structure.

The temperature for impregnation is selected to be at or below, and is maintained at or below, the glass transition temperature (Tg) of the resin, preferably at or below the Tg of the resin at a given $CO_2$ concentration, such as the concentrations described below. In one embodiment the impregnation is carried out at about −57, −55, −50, −45, −40, −35, −30, −25, −20, −15, −10, −5, −1, 0, 1 or 2° C., and useful ranges may be selected between any of these values (for example, about 2 to about −57, about 1 to about −57, about 0 to about −57, about −1 to about −57, about −30 to about −57 or about −35 to about −57° C.).

In one embodiment impregnation is conducted for at least about 1, 5, 10, 20, 30, 40, 50, 60, 70, 80, 90, 100, 110, 120, 130, 140, 150, 160, 170, 180, 190, 200, 210, 220, 230 or 240 minutes, or 1, 2, 3, 4, 5, 6, 7, 8, 9, 10, 11, 12, 13, 14, 15, 16, 17, 18, 19, 20, 21, 22, 23 or 24 hours, and useful ranges may be selected between any of these values (for example, about 1 to 240, 10 to 240, 10 to 200, 10 to 150, 10 to 100, 20 to 240, 20 to 200, 20 to 150, or 20 to 100 minutes, or about 1 to 24, 2 to 23, 3 to 22, 4 to 21, 5 to 20, 6 to 18, 7 to 17, 8 to 16, 9 to 15 or 10 to 14 hours).

In one embodiment the $CO_2$ concentration of the resin after impregnation is up to about 55% by weight or otherwise up to a saturated level, including about 1, 2, 3, 4, 5, 10, 15, 20, 25, 30, 35, 40, 45, 50 or 55% by weight, and useful ranges may be selected between any of these values (for example, about 1 to about 50, about 10 to about 50, about 20 to about 50 or about 30 to about 45%).

In one embodiment the method further comprises holding the impregnated resin under conditions to prevent a significant increase in crystallinity.

In one embodiment the method further comprises holding the impregnated resin at a temperature and pressure that prevents the resin from expanding while allowing the level of impregnated $CO_2$ to reduce to about 5 to 35% by weight prior to the expanding step, including 5, 10, 15, 20, 25, 30 or 35% by weight, and useful ranges may be selected between any of these values (for example, about 10 to about 30, about 15 to about 30 or about 15 to about 25%).

In one embodiment the temperature for the holding (conditioning) step is selected to be at or below and is maintained at or below the glass transition temperature (Tg) of the resin, preferably at or below the Tg of the resin at a given $CO_2$ concentration, such as the concentrations described below. In one embodiment the impregnated resin is held at about −57, −55, −50, −45, −40, −35, −30, −25, −20, −15, −10, −5, −1, 0, 1, 2, 3 or 4° C., and useful ranges may be selected between any of these values (for example, about 4 to about −57° C.).

In various embodiments the impregnation step, the holding step, or the impregnation step and the holding step are conducted at a temperature that is at or below the glass transition temperature of the resin, preferably at or below the Tg of the resin at a given $CO_2$ concentration, such as the concentrations described above and below.

In one embodiment the impregnated resin is held at a pressure that prevents the resin from expanding.

In one embodiment the impregnated resin is held until the $CO_2$ concentration reduces to about 5, 10, 15, 20, 25, 30 or 35% by weight, and useful ranges may be selected between any of these values (for example, about 5 to about 30% or about 10 to about 25%).

In one embodiment the $CO_2$ concentration of the impregnated resin immediately before expansion is up to about 35% by weight.

In one embodiment the expanding step comprises pre-expansion, pre-expansion then moulding, or moulding without pre-expansion.

In one embodiment the expanding step comprises heating the impregnated polylactic acid resin at a temperature of about 15° C. to about 150° C.

In one embodiment the pre-expansion comprises a temperature of about 15, 20, 25, 30, 35, 40, 45, 50, 55, 60, 65, 70, 75, 80, 85, 90, 95, 100, 105, 110, 115, 120, 125, 130, 135 or 140° C., and useful ranges may be selected between any of these values (for example, about 15 to about 140° C.). Pre-expansion comprises contacting the resin or a mould containing the resin with a hot fluid such as hot water, steam, hot air or hot oil, or by exposing the resin to electromagnetic radiation such as microwaves.

In one embodiment pre-expanding the resin is conducted by heating the resin to the pre-expansion temperature for at least about 1, 5, 10, 20, 30, 40, 50, 60, 70, 80, 90, 100, 110, 120, 130, 140, 150, 160, 170, 180, 190, 200, 210, 220, 230 or 240 seconds, and useful ranges may be selected between any of these values (for example, about 1 to 240, 1 to 120, 5 to 240, 5 to 120, 10 to 240, 10 to 120, 20 to 240, or 20 to 120 seconds).

In one embodiment moulding comprises placing the impregnated or pre-expanded resin in a mould and heating the mould at about 50, 55, 60, 65, 70, 75, 80, 85, 90, 95, 100, 105, 110, 115, 120, 125, 130, 135, 140, 145 or 150° C., and useful ranges may be selected between any of these values (for example, about 50 to about 150° C.).

In one embodiment the mould is heated for about 5, 10, 20, 30, 40, 50, 60, 70, 80, 90, 100, 110, 120, 150 or 180 seconds, and useful ranges may be selected between any of these values (for example, about 1 to about 180 seconds).

In one embodiment moulding comprises application of a vacuum to the mould for about 1, 5, 10, 20, 30, 40, 50, 60, 70, 80, 90, 100, 110, 120, 130, 140, 150, 160, 170, 180, 190, 200, 210, 220, 230 or 240 seconds, or about 1, 2, 3, 4, 5, 6, 7, 8, 9 or 10 minutes, and useful ranges may be selected between any of these values (for example, about 1 to 240, 1 to 120, 5 to 240, 5 to 120, 10 to 240, 10 to 120, 20 to 240, or 20 to 120 seconds, or about 1 second to about 10 minutes).

In various embodiments the resin comprises at least about 40, 45, 50, 55, 60, 65, 70, 75, 80, 85, 90, 95, 99, or 100% PLA by weight, and useful ranges may be selected between any of these values (for example, about 40 to about 100, about 50 to about 100, or about 60 to about 100%).

In one embodiment the resin comprises a PLA copolymer, a PLA block copolymer, a PLA homopolymer or a blend of PLA with one or more other polymers.

In one embodiment the PLA copolymer comprises at least about 88% by weight L- or D-lactic acid or is a blend of poly(L-lactic acid) and poly(D-lactic acid) homopolymer, or a blend of PLA block copolymers where each block has an isomer purity of greater than 88% of L-lactic acid or D-lactic acid.

In one embodiment a PLA copolymer comprises an isomer purity of about 88, 89, 90, 91, 92, 94, 95, 96, 97, 98, 99, 99.5 or 99.9% by weight, and useful ranges may be selected between any of these values (for example, about 88 to about 99.9, about 90 to about 99.9, or about 92 to about 99.9%).

In one embodiment a PLA copolymer blend comprises a blend with an isomer purity of about 88, 89, 90, 91, 92, 94, 95, 96, 97, 98, 99, 99.5 or 99.9% by weight, and useful ranges may be selected between any of these values (for example, about 88 to about 99.9, about 90 to about 99.9, or about 92 to about 99.9%).

In one embodiment a PLA copolymer comprises a D-isomer content of from about 0% to about 12% by weight and an L-isomer content of from about 88 to about 100% by weight.

In one embodiment a PLA copolymer comprises a L-isomer content from about 0% to about 12% by weight and a D-isomer content of from about 88% to about 100% by weight.

In one embodiment a PLA copolymer blend comprises a blend of a copolymer comprising a total D-isomer content of about 0% to about 12% by weight with a copolymer comprising a total L-isomer content of about 0% to about 12% by weight.

In one embodiment the PLA resin comprises stereocomplex blends of pure PDLA (or high-purity PDLA) and PLLA (or high-purity PLLA). The blends may comprise about 1, 3, 5, 10, 20, 30, 40 or 50% PLLA (or PDLA) by weight, and useful ranges may be selected between any of these values (for example, about 1 to about 50, about 10 to about 50, or about 20 to about 50%).

In various embodiments the PLA resin comprises lactic acid polymerised with co-monomers other than lactic acid, a PLA polymer blended with one or more crystallisable or amorphous non-PLA polymers, or a modified PLA such as a cross-linked PLA or a functionalised PLA.

In one embodiment the resin comprises PLA polymerised with other co-monomers, PLA blends with other polymers, and modified PLA, including cross-linked PLA or functionalised PLA.

In various embodiments, blends of any two or more of the polymers described above are contemplated. Other polymers known to be used in blends with PLA can also be used.

In one embodiment the copolymer is a copolymer of lactic acid and a comonomer capable of forming a polymer, preferably a biodegradable polymer, such as an ester, methacrylate, methyl methacrylate, glycolic acid, s-caprolactone, a hydroxyalkanoate, hydroxybutyrate, hydroxyvalerate, hydroxyhexanoate, or hydroxyoctanoate, for example. In one embodiment the copolymer is poly(lactic-co-glycolic acid), or poly(lactic-co-caprolactone). In one embodiment, the copolymer comprises at least 40, 45, 50, 55, 60, 65, 70, 75, 80, 85, 90, 95, or 99% PLA by weight, and useful ranges may be selected between any of these values (for example, about 40 to about 99, about 50 to about 99, about 60 to about 99, about 70 to about 99, about 80 to about 99, or about 90 to about 99%).

In one embodiment the block copolymer comprises one or more blocks of one or more polymers, preferably biodegradable polymers, such as a polymer of an ester (a polyester), methacrylate (polymethacrylate), methyl methacrylate (poly(methyl methacrylate), PMMA), glycolic acid (polygloycolic acid, PGA), ε-caprolactone (polycaprolactone, PCL), a hydroxyalkanoate (poly-hydroxyalkanoate, PHA), hydroxybutyrate (poly-hydroxybutyrate, PHB), hydroxyvalerate (poly-hydroxyvalerate, PHV), hydroxyhexanoate (poly-hydroxyhexanoate, PHH), or hydroxyoctanoate (poly-hydroxyoctanoate, PHO), for example. In one embodiment, the block copolymer comprises at least 40, 45, 50, 55, 60, 65, 70, 75, 80, 85, 90, 95, or 99% PLA by weight, and useful ranges may be selected between any of these values (for example, about 40 to about 99, about 50 to about 99, about 60 to about 99, about 70 to about 99, about 80 to about 99, or about 90 to about 99%).

In one embodiment the blend is a blend of lactic acid and a polymer, preferably a biodegradable polymer, such as a polymer of an ester (a polyester), methacrylate (polymethacrylate), methyl methacrylate (poly(methyl methacrylate), PMMA), glycolic acid (polygloycolic acid, PGA), s-caprolactone (polycaprolactone, PCL), a hydroxyalkanoate (poly-hydroxyalkanoate, PHA), hydroxybutyrate (poly-hydroxybutyrate, PHB), hydroxyvalerate (poly-hydroxyvalerate, PHV), hydroxyhexanoate (poly-hydroxyhexanoate, PHH), or hydroxyoctanoate (poly-hydroxyoctanoate, PHO), for example. In one embodiment, the blend comprises at least 40, 45, 50, 55, 60, 65, 70, 75, 80, 85, 90, 95, or 99% PLA by weight, and useful ranges may be selected between any of these values (for example, about 40 to about 99, about 50 to about 99, about 60 to about 99, about 70 to about 99, about 80 to about 99, or about 90 to about 99%). In one embodiment the blend comprises about 50 to about 70% by weight PLA. In one embodiment the blend comprises poly (methyl methacrylate) and about 50 to about 70% by weight PLA.

In one embodiment the resin is in the form of a particle, bead, rod, bar, sheet, film, moulded shape (such as a clamshell, pot, box, bowl, cup, plate or tray) or extruded shape. Accordingly, in one embodiment the impregnated resin is in the form of a particle, bead, rod, bar, sheet, film, moulded shape (such as a clamshell, pot, box, bowl, cup, plate or tray) or extruded shape.

In one embodiment the resin further comprises one or more fillers, additives, nucleating agents, plasticisers or co-blowing agents, or any combination of any two or more thereof.

In one embodiment the resin comprises about 1, 5, 10, 15, 20, 25, 30, 35, 40, 45 or 50% by weight of one or more fillers, additives, nucleating agents, plasticisers or co-blowing agents, or any combination of any two or more thereof, and useful ranges may be selected between any of these values (for example, about 1 to about 10, about 1 to about 20, about 1 to about 30, about 1 to about 40, or about 1 to about 50%). In one embodiment the resin comprises about 1 to about 10% or about 1 to about 5% by weight bark.

In one embodiment the foam comprises polylactic acid, or otherwise comprises a resin as is described above.

In one embodiment the foam comprises at least about 88% by weight L or D lactic acid or a blend of poly-L-lactic acid and poly-D-lactic acid homopolymer, or a blend of PLA block copolymers where each block has an isomer purity of greater than 88% of L-lactic acid or D-lactic acid.

In one embodiment the foam comprises one or more fillers, additives, nucleating agents, plasticisers or co-blowing agents, or any combination of any two or more thereof, as described above.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

The invention may also be said broadly to consist in the parts, elements and features referred to or indicated in the specification of the application, individually or collectively, in any or all combinations of two or more of said parts, elements or features, and where specific integers are mentioned herein which have known equivalents in the art to which the invention relates, such known equivalents are deemed to be incorporated herein as if individually set forth.

DETAILED DESCRIPTION

The inventor has discovered that crystallisable grades of polylactic acid (PLA) and crystallisable PLA resins, including copolymers and blends, can be impregnated and foamed to low density. Crystallisable grades of PLA (including stereocomplex PLA) and PLA resins lead to better thermal stability than found previously for PLA foam and indeed other PLA foam structures.

The present invention relates to a method of foaming crystallisable PLA, including stereocomplex PLA and other PLA resins, the method comprising impregnating solid polymer, such as PLA resin with $CO_2$ by contacting the resin with liquid $CO_2$ at temperatures below about 2° C., 1° C. or 0° C. and more preferably at a temperature of about −57° C. to about 2° C. at a corresponding pressure that ensures the $CO_2$ remains in the liquid phase, removing the resin from the liquid $CO_2$, and holding the impregnated resin at a temperature and pressure that prevents it from crystallising or foaming while allowing the level of impregnated $CO_2$ to reduce to a level suitable for foaming.

Liquid $CO_2$ impregnation of PLA is performed at a temperature that minimises premature crystallisation. For example, impregnation of crystallisable PLA can be carried out at a temperature of from about −57° C. to about 2° C., more preferably about −57° C. to about −30° C. for high expandability.

This method can be used for crystallisable PLA which has been prepared in an amorphous state.

This method can also be applied to PLA polymerised with other co-monomers, PLA blends with other polymers, and modified PLA, including cross-linked PLA or functionalised PLA. The optimum impregnation temperature range may be adjusted for these PLA-based polymers, according to the material's initial Tg, $CO_2$ uptake and Tg-$CO_2$ relationship. That is, the temperature for impregnation will vary with each polymer but will be such that temperature of impregnation and/or conditioning is at or below the Tg of the newly plasticised (by $CO_2$ or another plasticiser) polymer.

This method can be used for PLA in various physical shapes including particles, beads, rods, bars, sheets, films, moulded shapes (such as clamshells, pots, boxes, bowls, cups, plates or trays) or extruded shapes.

As noted above, the liquid $CO_2$ impregnation is carried out under conditions that minimise premature crystallisation of the polymer.

Figure 1:
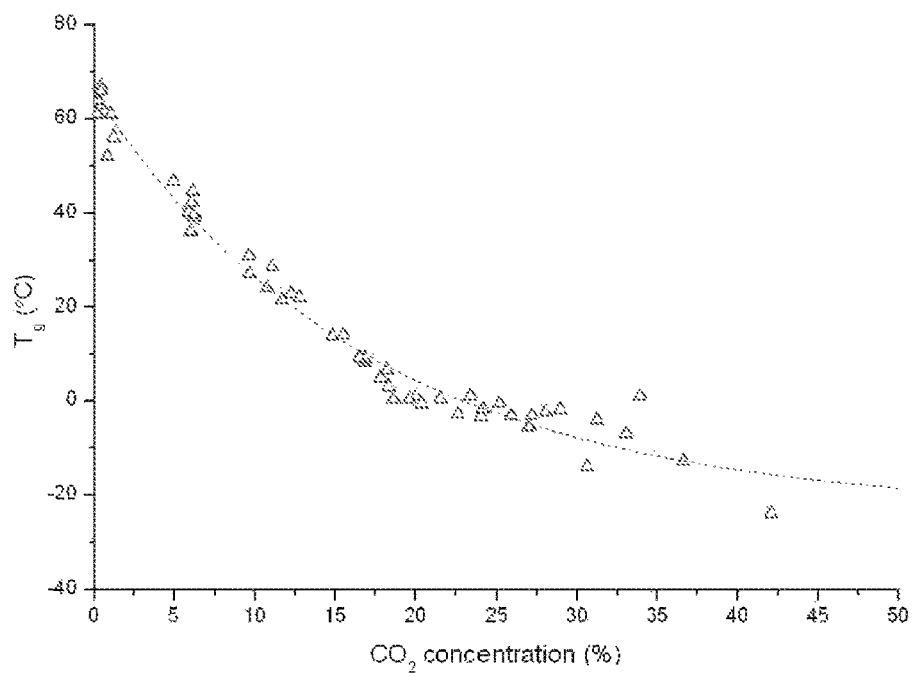
FIG. 1 is a graph showing the relationship between the glass transition temperature, Tg for PLA and $CO_2$ concentration (1.4% D PLA).

Post-impregnation, the polymer is held under conditions that prevent crystallisation of the polymer. That is, a temperature at or below the glass transition temperature, Tg, of the PLA, that is influenced by the concentration of $CO_2$ as defined by the graph of FIG. 1.

The percentage of $CO_2$ absorbed by the PLA through impregnation is about 1 to about 55% by weight of the polymer-$CO_2$ mixture, or otherwise up to a saturated level. The residence time in the liquid $CO_2$ is chosen to ensure the PLA sample is impregnated with the desired amount of $CO_2$ for the intended application. The residence time is dependent sample shape, size and temperature, but not pressure (provided the pressure used retains the $CO_2$ in the liquid phase). For example, 2 mm PLA rods (Ingeo™ grade 3001D) require an impregnation time of greater than 2 hours if impregnated at −50° C.

After impregnation, the PLA is held to allow the level of $CO_2$ in the PLA to reduce to a level suitable for foaming. The level of $CO_2$ in the PLA suitable for foaming can vary but typically is about 5 to about 30% by weight, preferably about 10 to about 25% by weight.

1. Definitions

The term "comprising" as used in this specification and claims means "consisting at least in part of". When interpreting statements in this specification and claims which include the "comprising", other features besides the features prefaced by this term in each statement can also be present. Related terms such as "comprise" and "comprised" are to be interpreted in similar manner.

The term "crystallisable" in relation to a polymer means that the polymer is capable of crystallising and also melting. The term "semi-crystalline" has a similar meaning. For a poly(D,L)lactic acid copolymer, the lower the concentration of one of the monomers with respect to the other, the higher the potential crystallinity of the PLA will be. In addition, when PLA comprising of 100% L-lactic acid (PLLA), or high-purity PLLA, is blended with PLA comprising of 100% D-lactic acid (PDLA), or high-purity PDLA, a highly regular stereocomplex can be formed upon crystallisation. Temperature stability after foaming is maximised when a 50:50 blend is used, but even at lower concentrations of 3-10% of PDLA in PLLA (or vice versa), there is still a substantial improvement.

The term "crystallisable" in relation to PLA refers to PLA copolymers with an isomer purity of about 88% or more and blends of one or more such copolymers wherein the isomer purity of the blend is still about 88% or more—for example, copolymers with a D-isomer content of from about 0% to about 12% by weight and an L-isomer content of from about 88 to about 100% by weight, copolymers with an L-isomer content from about 0% to about 12% by weight and a D-isomer content of from about 88% to about 100% by weight, blends of such copolymers with a total D-isomer content of about 0% to about 12% by weight, and blends of such copolymers with a total L-isomer content of about 0% to about 12% by weight, prepared in an amorphous state. Furthermore, the term "crystallisable" in relation to PLA also refers to stereocomplex blends of pure PDLA (or high-purity PDLA) and PLLA (or high-purity PLLA).

2. Polylactic Acid and Other Resins

Polylactic acid (PLA) is a polymer comprising of lactic acid monomer units. PLA is produced industrially by polymerisation of lactic acid obtained by the bacterial fermentation of biomass such as beet, sugarcane, cornstarch or milk products. Lactic acid occurs in two stereoisomers, L-lactic acid and D-lactic acid. PLA comprises of a certain proportion of L-lactic acids monomers and a certain proportion of D-lactic acid monomers. The ratio between the L- and D-lactic acid monomers in PLA determines its properties. When PLA contains more than approximately 12% of one lactic monomer (either L or D) it can no longer crystallise and is hence completely amorphous. The lower the concentration of one of the monomers with respect to the other, the higher the potential crystallinity of the PLA will be.

Crystallisable PLA copolymers, crystallisable PLA block copolymers or crystallisable PLA homopolymers, or a blend of any two or more thereof, or a blend of any one or more thereof with one or more other polymers, each as described above, are contemplated for use herein.

PLA can be polymerised with co-monomers other than lactic acid, or blended with other polymers, and modified in various ways such as cross-linking or functional is in g.

For a crystallisable resin to be expanded into a foam, it should be prepared in such a way as to minimise crystallinity in the polymer prior to impregnation with liquid $CO_2$. Minimised crystallinity can be achieved by melting a resin and rapidly cooling the resin from the melt, or by using a dissolution/precipitation method. Such methods are known in the art.

In addition, liquid $CO_2$ impregnation, and the subsequent conditioning phase, should be carried out to minimise any increase in the crystallinity of the polymer prior to any expansion/foaming step.

3. Method of Impregnation

There are a number of reported processes that use $CO_2$ to impregnate expandable (foamable) polymers such as PLA, where the $CO_2$ acts as a blowing agent to produce a polymer foam. Reported foaming and moulding processes using, for example, PLA impregnated with $CO_2$ generally involve impregnating PLA resin, such as resin beads with gaseous or supercritical $CO_2$, pre-expanding the impregnated resin, resting and optionally treating the pre-expanded resin, before re-impregnating the resin with more $CO_2$ or another blowing agent and further expanding/fusing the resin in a mould. The present invention uses liquid $CO_2$ to impregnate PLA.

During liquid $CO_2$ impregnation at a given temperature (T), $CO_2$ is known to plasticise PLA and decrease its glass transition temperature, Tg. If Tg is decreased significantly below T, PLA can crystallise. This crystallisation is generally detrimental to foaming. The decrease of Tg is a function of $CO_2$ absorption, which itself is a function of impregnation temperature.

The process can be applied to any crystallisable PLA as previously defined but it is preferentially applied to PLA with a high crystallisation ability, for example PLA homopolymer (L or D) with a purity higher than 95%, 97% or 99%, or a stereocomplex blend, a PLA copolymer or block copolymer, or a PLA-based resin with equivalent or better crystallisation ability.

In one embodiment, the process is applied to a crystallisable PLA resin that has been prepared in an amorphous state of, for example, less than about 20% crystallinity. An amorphous state comprising less than about 20% crystallinity may be determined by differential scanning calorimetry (DSC). A suitable DSC method comprises heating 5-10 mg of material from 20° C. to at least 20° C. above the end of the melting endotherm under a heating rate of 5° C. per minute. Crystallinity is calculated by subtracting the crystallisation exotherm area from the melting endotherm area. The melting enthalpy of PLA homocrystals and PLA stereocomplex crystals are assumed to be 93 J/g and 142 J/g respectively.

Liquid $CO_2$ impregnation is carried out between −57 and 2° C., or preferentially between −57 and −30° C. Pressure is applied to ensure that $CO_2$ is in its liquid state. For example, in an impregnation carried out at −50, −40, −30, −20, −10 or 0° C., the pressure is at least 6.8, 10.1, 14.3, 19.7, 26.5 or 34.9 bar respectively.

Polymer resin, such as in bead, extruded or moulded form, is placed in a pressure vessel. The vessel is cooled to the required temperature of about −57° C. to about 2° C. Liquid $CO_2$ is introduced into the vessel to the required pressure (e.g. about 5 to 100 bar). After a period of time suitable for the desired degree of impregnation, $CO_2$ pressure is released and the vessel removed from temperature control. Impregnation continues for at least about 10, 30, 60, 90, 120 minutes, or about 3, 6, 7 or 12 hours or more until $CO_2$ impregnation is complete. $CO_2$ impregnation is complete when the $CO_2$ content of the polymer resin is about 0 to about 55% by weight of the polymer-$CO_2$ mixture, or otherwise up to a saturated level.

Impregnated resin may be stored under refrigerated conditions at a temperature of about −57 to about 4° C. or is processed directly. The $CO_2$ content of stored resin will reduce over time and is optionally allowed to reduce to a $CO_2$ concentration of about 5 to about 30% by weight, including about 10 to about 25% by weight.

Impregnated resin, whether after storage or directly after impregnation, is then subjected to pre-expansion, or pre-expansion and moulding, or moulding without pre-expansion.

A pre-expansion step involves heating the impregnated resin or a mould containing the resin for a suitable time, such as for about 1 to about 120 seconds, at a suitable temperature, such as about 15 to about 140° C., using a suitable heating mechanism, such as, for example, a hot fluid such as hot water, steam, hot air or hot oil, or by exposing the resin to electromagnetic radiation such as microwaves.

Once impregnated or pre-expanded resin is added to a mould, a combination of steam heating, such as at about 50 to about 150° C., for about 5 to 180 seconds, for example, and optional vacuum, such as for about 1 second to about 10 minutes, for example, is applied to expand or further expand and fuse the resin. Steam and optionally vacuum are applied to fuse the impregnated resin and fill the mould shape, to make a foam block. Other methods known in the art for expanding and fusing the resin in the mould may be used, such as heating with microwaves, oil, or water, for example, with or without the application of vacuum. Cooling may be applied before de-moulding, using water cooling of the mould for example. Average block density can be readily calculated from the weight and dimensions of the block. Block density is preferably measured 48 hours after moulding by which time the $CO_2$ levels have stabilised.

4. Fillers and Additives

The resin may be blended with other fillers, additives, nucleating agents (e.g. talc), plasticisers or co-blowing agents up to 50% by weight.

In one embodiment the fillers are inert and/or biodegradable. Suitable fillers include but are not limited to talc, calcium carbonate, calcium stearate, sand, clay, zeolite, bark (including pine bark), sawdust, wood flour, biomass, polymers, biodegradable polymers, flour or fibre derived from plants, inorganic filler, borax, zinc borate, aluminium hydroxide, natural fibres, pigments, or any mixture of any two or more thereof. Preferred fillers include talc, calcium carbonate, clay, zeolite, bark (including pine bark), sawdust, wood flour, biomass, polymers, biodegradable polymers, or flour or fibre derived from plants, or any mixture of any two or more thereof. In one embodiment the PLA is blended with about 1, 5, 10, 15, 20, 25, 30, 35, 40, 45 or 50% by weight of one or more fillers or additives, and useful ranges may be selected between any of these values (for example, about 1 to about 50%).

Various aspects of the invention will now be illustrated in non-limiting ways by reference to the following examples.

EXAMPLES

General Protocol

Unless otherwise stated, the following general protocol was followed. Crystallisable PLA, typically as beads, rods, injection moulded articles or solvent casted sheet was prepared with low levels of crystallinity. In some experiments, fillers or other additives were included (e.g. talc). The PLA articles were placed in a pressure vessel suited to withstand the required pressure and temperature ranges. The vessel was cooled to the required temperature (−55 to 0° C.). Liquid $CO_2$ was introduced into the vessel to the required pressure (e.g. about 25 to 35 bar). The pressure was monitored throughout the impregnation to ensure it remained within the range required. After a period of time (at −50° C., this is at least 60 minutes for 1.5 mm diameter beads, 120 minutes for extruded 2 mm rods, 90 minutes for 1 mm thick moulded bars for best results, optionally longer—overnight for example) $CO_2$ pressure was released and the vessel removed from temperature control. The PLA was weighted before and after impregnation to calculate % $CO_2$ uptake by weight.

In some cases, $CO_2$ impregnated PLA was expanded directly. Alternatively, the impregnated PLA was stored in refrigerated conditions, for example in a standard freezer at −18° C., and then subjected to pre-expansion, pre-expansion and moulding, or moulding without pre-expansion. A third option was to store the impregnated PLA until all $CO_2$ had been lost.

The pre-expansion step involves heating the impregnated beads (e.g. for about 5 seconds) at a suitable temperature (15 to 120° C.) using hot water, steam or hot air.

Once impregnated or pre-expanded beads are added to the mould, a combination of steam heating (about 50 to 150° C., for about 5 to 180 seconds for example) and optional vacuum (for about 1 second to 10 minutes for example) was applied to further expand and fuse the beads. Steam and optionally vacuum are applied for a short time (e.g. 2 to 10 minutes) to fuse the impregnated beads and fill the mould shape, to make a foam block. Cooling may be applied before de-moulding, using water cooling of the mould for example. Average block density can be readily calculated from the weight and dimensions of the block. Block density is preferably measured 48 hours after moulding by which time the $CO_2$ levels have stabilised.

Figure 2:
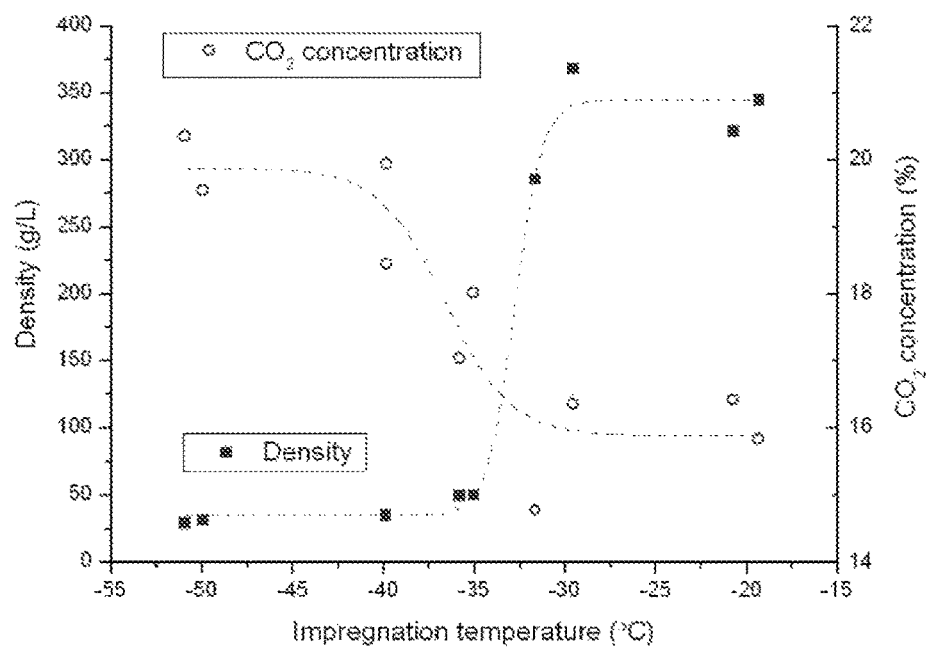
FIG. 2 is a graph showing the minimum density and corresponding $CO_2$ concentration at foaming as a function of impregnation temperature (1.4% D PLA).

Example 1: 1.4% D PLA Rods, −50 to −20° C. Impregnation, Foaming at Various $CO_2$ Concentrations Crystallisable 1.4% D PLA (Ingeo™ grade 3001D) was extruded and subsequently cooled from the melt to room temperature using a water bath, ensuring negligible crystallisation. The extruded strands (2 mm in diameter) were then cut into 15 mm long rods. Rod samples were impregnated with liquid $CO_2$ at −50, −40, −35, −30 and −20° C. for a duration that allowed full saturation of PLA with $CO_2$. After impregnation, the samples were placed into a freezer at −18° C. to allow the $CO_2$ concentration to drop. Samples were taken out regularly, their $CO_2$ concentration measured by weight, and were foamed in 80° C. water for 20 seconds. Density of the foamed samples was measured. For each impregnation temperature, an optimum $CO_2$ concentration existed at which density was minimal (indicated in FIG. 2). Only impregnations below −35° C. produced low densities (approx. 40 g/L) as shown in FIG. 2. Impregnation above −35° C. produced high densities (approx. 300 g/L).

Figure 3:
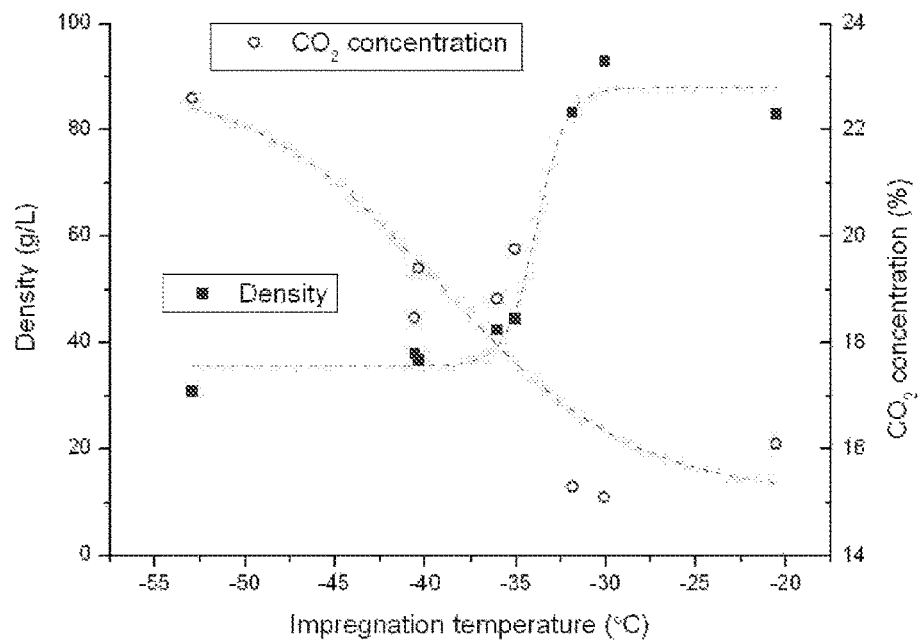
FIG. 3 is a graph showing the minimum density and corresponding $CO_2$ concentration at foaming as a function of impregnation temperature (4.3% D PLA).

Example 2: 4.3% D PLA Rods, −50 to −20° C. Impregnation, Foaming at Various $CO_2$ Concentrations Crystallisable 4.3% D PLA (Ingeo™ grade 4042D) was prepared and foamed as in example 1. A similar foaming behaviour was observed (FIG. 3).

Figure 4:
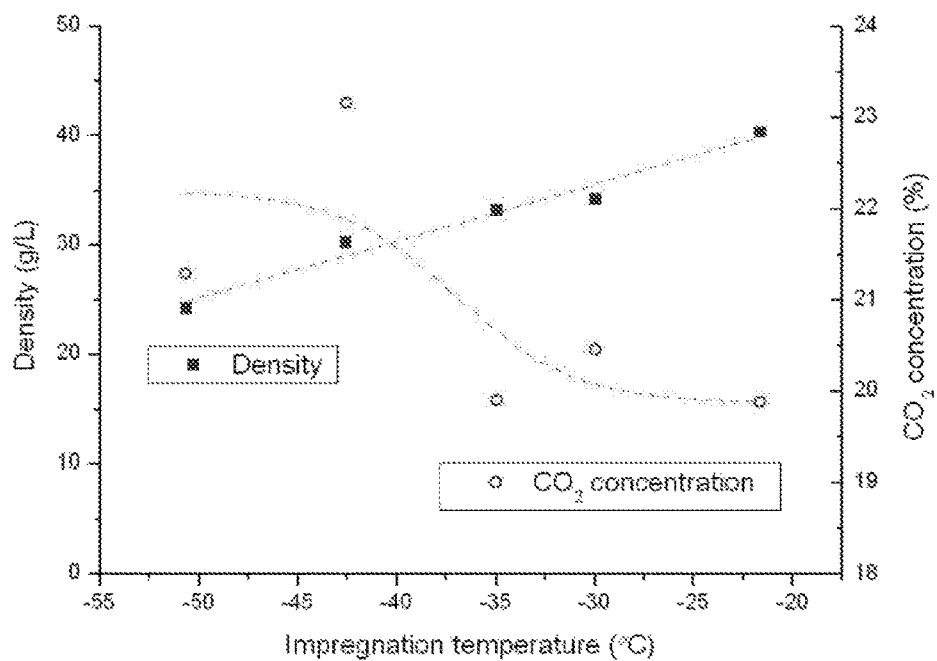
FIG. 4 is a graph showing the minimum density and corresponding $CO_2$ concentration at foaming as a function of impregnation temperature (7.7% D PLA).

Example 3: 7.7% D PLA Rods, −50 to −20° C. Impregnation, Foaming at Various $CO_2$ Concentrations Crystallisable 7.7% D PLA (a blend of 40% Ingeo™ grade 4042D and 60% Ingeo™ grade 8032D) was extruded and then foamed as described in example 1 except that the foaming temperature used was 75° C. instead of 80° C. The minimum density showed a linear trend over the impregnation temperature range used as seen in FIG. 4.

Example 4: Stereo-Complex PLA Rods, −50° C. Impregnation, Foaming at 80° C.

Figure 5:
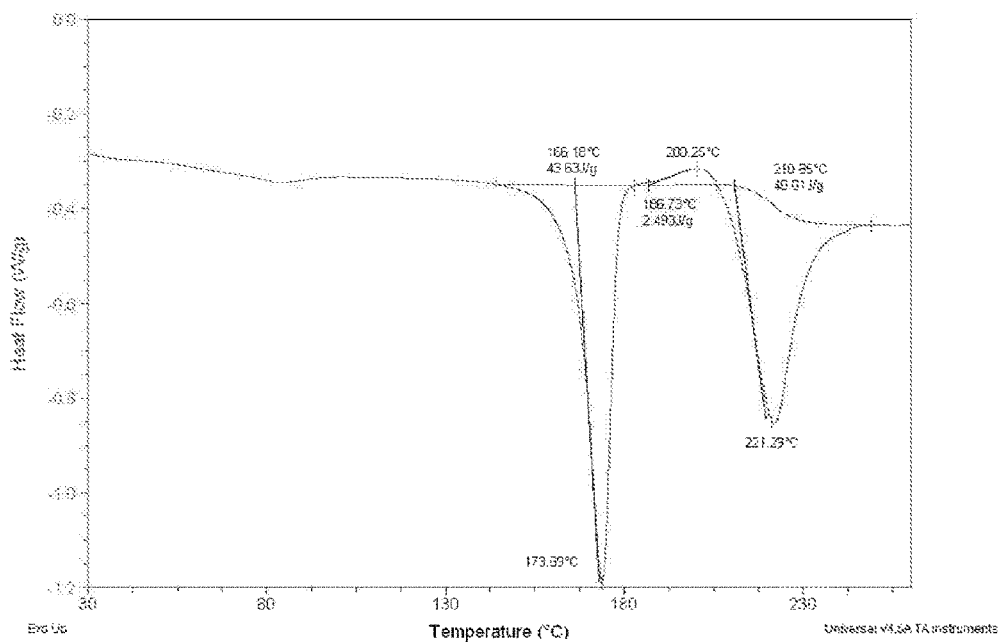
FIG. 5 is a graph showing the DSC trace of a 60 g/L stereocomplex PLA foam (10° C./min).

Stereo-complex PLA was prepared by extrusion-blending of PLLA and PDLA homo-polymers with a 1:1 ratio. The extruded rods were impregnated with liquid $CO_2$ at −50° C. for 4 hours, then stored at −18° C. for 2 to 2½ hours, and finally foamed in 80° C. water for 20 seconds. The foamed rods had a density between 50 and 70 g/L. DSC showed that the foamed samples comprised approximately 45% homocrystals, and 25% stereocomplex crystals (FIG. 5). The melting enthalpies of pure crystals are assumed to be 93 J/g and 142 J/g for the homocrystals and stereocomplex crystals respectively.

Example 5: Poly(D-Lactide)

Poly(D-lactic acid) (<1% L-isomer, melt flow index=22 g/minute at 190° C.) was melted at 190° C. and extruded and quenched using a CEAST melt flow tester. The strands (0.3-0.4 mm in diameter) were impregnated with liquid $CO_2$ at −50° C. for 1 hour. The impregnated material was stored at −18° C. until the $CO_2$ concentration decreased to 14-17 wt. %. The samples were then foamed in hot water (80° C.) for 10 seconds. The density of the foamed samples was measured at between 34 and 36 g/L.

Example 6: Fusing 1.4% D PLA Beads

Crystallisable 1.4% D PLA (Ingeo™ grade 3001D) extruded, subsequently cooled from the melt in a water bath, and pelletised (2 mm diameter beads). The beads were impregnated with liquid $CO_2$ at −50° C. for 2 hours 20 minutes, thus ensuring saturation with $CO_2$. The beads were stored in a freezer at −18° C. for 90 minutes when the $CO_2$ concentration reached 19 wt %. They were then prefoamed for 20 seconds in 65° C. hot water then quenched in cold water. The prefoamed beads were placed into a cylindrical mould (36 mm in diameter, 50 mm long) and fused with steam (approx. 90° C.) for 20 seconds. The moulded product exhibited good fusing and had a final density of approximately 42 g/L.

Example 7: Fusing 1.4% D PLA Beads

Crystallisable 1.4% D PLA (Ingeo™ grade 3001D) beads were prepared, impregnated and stored as in example 6. Prefoaming was performed in 60° C. water for 35 seconds then quenched in cold water. Fusing was done with 90° C. steam for 20 or 60 seconds. The mouldings exhibited good fusing and a density of approximately 46 g/L.

Example 8: Fusing 1.4% D PLA Beads

Crystallisable 1.4% D PLA (Ingeo™ grade 3001D) beads were prepared, impregnated and stored as in example 6. Prefoaming was performed in 70° C. water for 7 seconds then quenched in cold water. Fusing was done with 90° C. steam for 20 or 60 seconds. The mouldings exhibited good fusing and a density of approximately 47 g/L.

Example 9: Fusing 4.3% D PLA Beads

Crystallisable 4.3% D PLA (Ingeo™ grade 4042D) beads were prepared, impregnated and stored as in example 6. Prefoaming was performed in 70° C. water for 10 seconds then quenched in cold water. Fusing was done with 90° C. steam for 10, 20 or 60 seconds. The moulding exhibited good fusing and a density of 42-46 g/L.

Example 10: Dimensional Stability—Comparison Between Various Grades Using Rods Crystallisable 1.4% D PLA (Ingeo™ grade 3001D), 4.3% D PLA (Ingeo™ grade 4042D), 7.7% D PLA (a blend of 40% Ingeo™ grade 4042D and 60% Ingeo™ grade 8032D), and 11.8% D PLA (Ingeo™ grade 4060D), were extruded into rods as in example 1. The first three grades were impregnated with liquid $CO_2$ at −50° C. for 2 hours, then stored at −18° C. for 60 minutes before being foamed in 80° C. water to a density of approximately 40 g/L. 11.8% D PLA was impregnated at 0° C. for 50 minutes and stored 90 minutes at −18° C. before being foamed in 75° C. water to a density of 40 g/L. The foamed samples were dried at room temperature under air flow and then equilibrated for at least 48 hours. The exact volume of the samples was then measured and the samples were put in an oven at 70° C. for 24 hours. After this thermal treatment, the volume of the samples was re-measured, and the volumetric shrinkage $\Delta V$ induced by the thermal treatment calculated as:

$$\Delta V = 100 \times \frac{V_{initial} - V_{final}}{V_{initial}}$$

Figure 6:
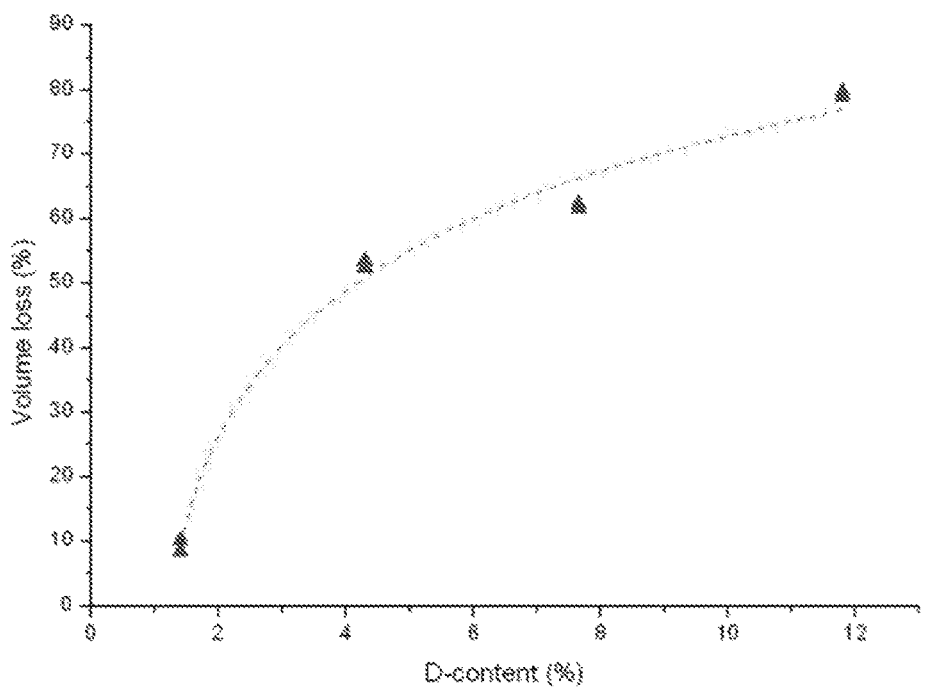
FIG. 6 is a graph showing the volumetric shrinkage plotted against D-content at 40 g/L.

Lower D-content led to lower shrinkage. In particular, shrinkage was significantly reduced for 1.4% D PLA (FIG. 6).

Figure 7A:
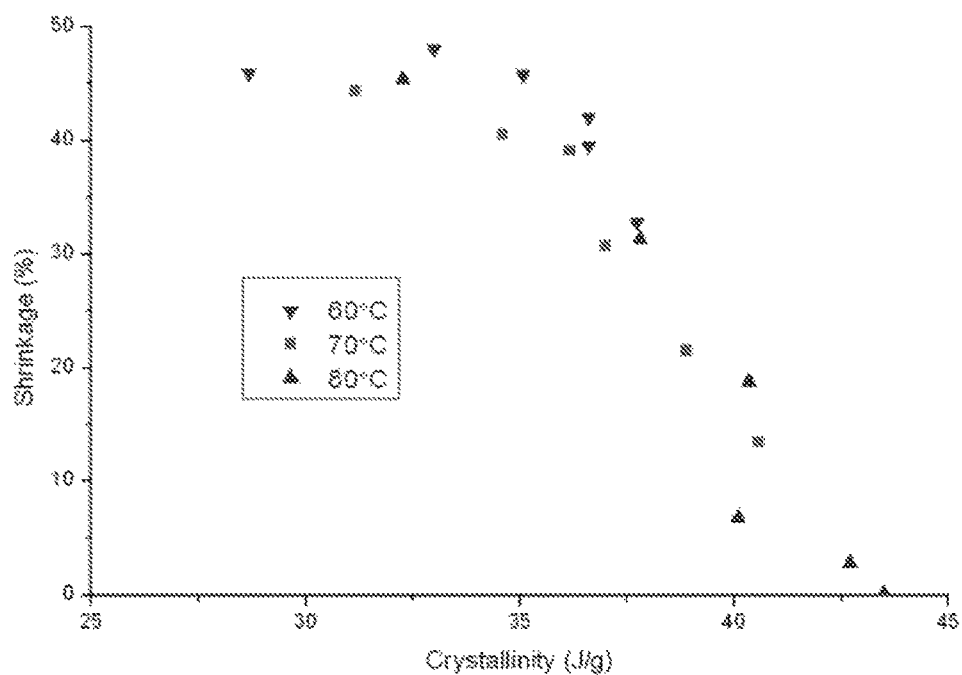
FIG. 7 is a graph showing the volumetric shrinkage of foamed 1.4% D PLA beads as a function of foam crystallinity (FIG. 7A) and foam density (FIG. 7B), for various foaming temperatures.
Figure 7B:
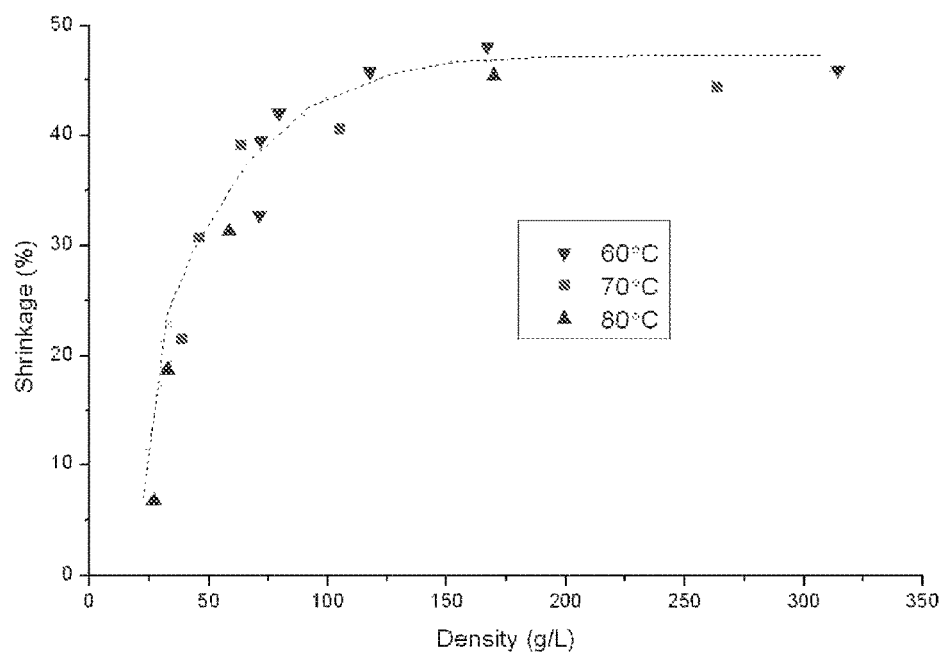

Example 11: Dimensional Stability of 1.4% D PLA with Various Foaming Conditions Crystallisable 1.4% D PLA (Ingeo™ grade 3001D) beads were extruded and impregnated with liquid $CO_2$ at −50° C. as described in example 6. After impregnation, they were stored at −18° C. for 90 minutes and then foamed in 60, 70 or 80° C. water for times ranging from 1 to 90 seconds. Crystallinity of the foamed beads was measured by DSC. Crystallinity appeared to increase with expansion during foaming. Dimensional stability at 70° C. was assessed as in example 10. FIG. 7 shows the link between crystallinity and shrinkage. Shrinkage virtually disappeared above a crystallinity threshold.

Example 12: Comparison of 1.4% D PLA Rods Prepared in the Amorphous State (Non-Annealed) and Crystallised State (Annealed) State, Impregnation and Foaming PLA 3001D rods (2 mm diameter) were annealed for 2 hours at 103° C. The samples were impregnated at −50° C. in liquid $CO_2$ for 4 hours along with non-annealed samples. The annealed samples were 'foamed' in a water bath (80° C.) at $CO_2$ concentration between 11 and 13%. They did not expand. The non-annealed samples were foamed at $CO_2$ concentrations of 11 and 20% and expanded to densities of 67 and 38 g/L, respectively.

Example 13: 1.4% D PLA Moulding and Properties

Figure 8:
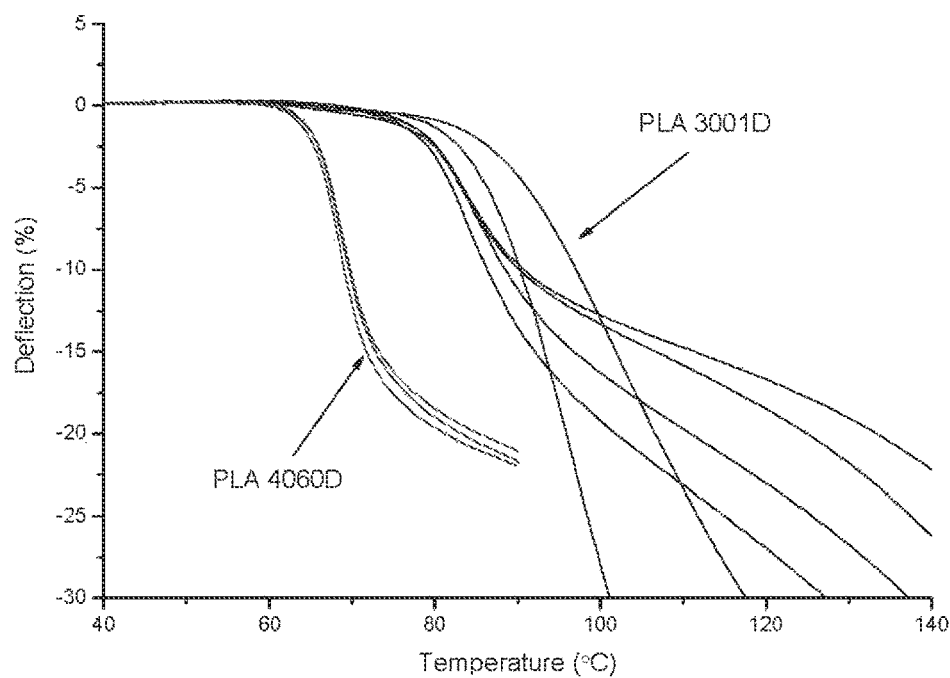
FIG. 8 is a graph showing the linear shrinkage under 10 kPa compression (heating rate is 2° C. per minute) for moulded PLA 4060D and PLA 3001D foams.

Crystallisable 1.4% D PLA (Ingeo™ grade 3001D) was extruded, subsequently cooled from the melt in a water bath, and pelletised (2 mm diameter beads). The beads were impregnated with liquid CO2 at −50° C. for 2 hours 20 minutes, thus ensuring saturation with CO2. The beads were stored in a freezer at −18° C. until the CO2 concentration reached 19-21 wt %. They were then prefoamed for 20 to 27 seconds in 65° C. hot water then quenched in cold water. The prefoamed beads were placed into a 5.5×5.5×10 cm mould and fused with steam for 20 to 40 seconds. The steam was provided by a pressurised boiler set at 95 to 110° C. The moulded blocks exhibited good fusing and had a final density of 33 to 42 g/L. For comparison, non-crystallisable 12% D PLA (Ingeo™ grade 4060D) was extruded the same way and impregnated with liquid CO2 at 10° C. for 1 hour. The beads were stored at −18° C. until the CO2 concentration reached 14 wt %. They were then prefoamed for 14 seconds in 70° C. hot water then quenched in cold water. They were fused in the previously described setup for 40 seconds with the boiler set at 90° C. These samples had a density of approximately 40 g/L. Typical properties are listed in Table 1. Cylindrical samples were cut from the moulded blocks and tested in a RSA-G2 DMTA apparatus (TA Instruments). The samples were subjected to a constant 10 kPa compressive stress and heated from room temperature at 2° C. per minute. The linear shrinkage was measured as the deflection of the sample (in % of the initial sample height) throughout the test. FIG. 8 shows typical examples of linear shrinkage-temperature obtained.

TABLE 1

Properties of moulded PLA foams at 40 g/L.

|  | PLA 3001D | PLA 4060D |
|---|---|---|
| Compressive modulus (MPa) | 7 | 10 |
| Compressive strength at 10% strain (MPa) | 0.27 | 0.27 |
| Tensile modulus (MPa) | 24 | 29 |
| Tensile strength (MPa) | 0.16 | 0.47 |
| Temperature at 5% linear shrinkage (° C.) | 81-90 | 67 |
| Crystallinity (%) | 40-47 | <5 |

Example 14: PMMA-PLA Blends

Figure 9:
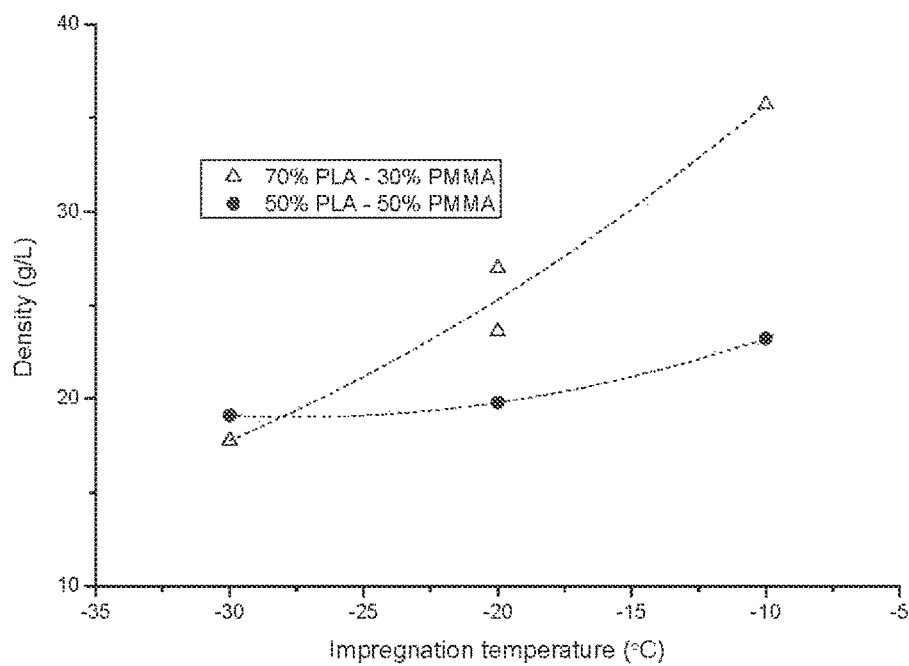
FIG. 9 is a graph showing the density versus impregnation temperature relationship for 70:30 and 50:50 semi-crystalline PLA:PMMA blends.

Crystallisable 1.4% D PLA (Ingeo™ grade 3001D) was blended with poly(methyl methacrylate) (PMMA, Chi Mei Corporation, Acryrex CM207) via extrusion. Two blends were made 70:30 and 50:50 (PLA:PMMA ratio) and pelletised into 2 mm beads. The beads were impregnated with liquid CO2 at −30, −20 and −10° C. until saturation. After impregnation, the samples were stored at −18° C. and foamed at various CO2 concentrations for 20 seconds in 90° C. water. The minimum density obtained at each impregnation temperature is displayed in FIG. 9. Furthermore, 50:50 blend beads were impregnated at −20° C. and stored at −18° C. until their CO2 concentration reached 18-20%. They were then prefoamed in 80° C. water for 10 seconds and moulded as described in Example 13. The moulded samples had density between 27 and 40 g/L, showed excellent fusing and mechanical properties.

Example 15: PLA with Talc

Crystallisable PLA (Ingeo™ grade 3051D, approximately 4-5% D) was extruded with (5% by weight) or without talc into 2 mm beads. The beads were impregnated with liquid $CO_2$ between −50 and −40° C. for at least 2½ hours. The impregnated beads were then stored at −18° C. When their $CO_2$ concentrations reached approximately 18% they were prefoamed in a 65° C. water bath for 15 seconds and then moulded in the setup described earlier in Example 13 with the boiler set at 110° C. Steam was applied for 20 seconds. Samples without talc exhibited excellent fusing and had a density of 40 g/L. The samples containing talc had good fusing and density of 43 g/L.

Example 16: PLA with Bark

Crystallisable PLA (Ingeo™ grade 3051D, approximately 4-5% D) was extruded with 1, 5 or 20% bark and then injection-moulded into a 1 mm thick article. Strip samples were cut from these and were impregnated with liquid $CO_2$ between −50 and −40° C. for 2½ hours. The impregnated samples were then stored at −18° C. When their $CO_2$ concentrations reached approximately 22% they were prefoamed at 80° C. for 20 seconds. The samples were dried at room temperature. Samples with 1 and 5% bark foamed to low density (<40 g/L).

Example 17: PLA with Bark—Moulded Shape

Crystallisable PLA (Ingeo™ grade 3051D, approximately 4-5% D) was extruded with 5% bark and then injection-moulded into pots with 1 mm thick walls. The samples were impregnated with liquid $CO_2$ between −20 and −10° C. at 40 bar in a 2 L Parr pressure vessel for 2 hours 20 minutes. The impregnated samples were then stored at −18° C. When their $CO_2$ concentrations reached approximately 16 wt. % they were prefoamed at 80° C. for 20 seconds. The samples were then dried at room temperature. The density of the samples was measured at 55-68 g/L.

Example 18: Expansion with Air

Crystallisable 1.4% D PLA (Ingeo™ grade 3001D) was extruded and pelletised into 2 mm beads. The beads were impregnated with liquid $CO_2$ between −50 and −40° C. for 3 hours. After impregnation, the samples were stored at −18° C. until their $CO_2$ concentrations reached 17-20%. The beads were then foamed for approximately 1 minute with hot air in a modified kitchen pop corn maker set at 80° C. The bulk density of the foamed beads was measured at 25-30 g/L.

INDUSTRIAL APPLICABILITY

The products and processes of the present invention have application in the packaging industry and other areas employing expanded polymer foams.

Those persons skilled in the art will understand that the above description is provided by way of illustration only and that the invention is not limited thereto.

What I claim is:

1. A method of producing polylactic acid foam, the method comprising
   (a) providing a crystallisable polylactic acid resin, the crystallisable polylactic acid resin comprising a polylactic acid resin that has been prepared in an amorphous state and that has been impregnated with liquid $CO_2$ at a temperature of −57° C. to 0° C., the resin comprising less than 5% crystallinity as determined by differential scanning calorimetry and at least 92% by weight L- or D-lactic acid, and
   (b) expanding the impregnated resin to produce a foam having a crystallinity of at least 15% by weight and a density of 5 to about 150 g/L.

2. A method of claim 1, wherein the foam exhibits a volumetric shrinkage of less than 35% when maintained at 70° C. for 24 hours.

3. A method of claim 1, further comprising holding the impregnated resin under conditions to prevent a significant increase in crystallinity prior to the expanding step.

4. A method of claim 3, further comprising holding the impregnated resin at a temperature and pressure that prevents the resin from expanding while allowing the level of impregnated $CO_2$ to reduce to 5 to 35% by weight prior to the expanding step.

5. A method of claim 1, wherein the $CO_2$ concentration of the impregnated resin immediately before expansion is up to 35% by weight.

6. A method of claim 1, wherein the expanding step comprises pre-expansion, pre-expansion then moulding, or moulding without pre-expansion.

7. A method of claim 1, wherein the expanding step comprises heating the impregnated polylactic acid resin at a temperature of 15° C. to 140° C.

8. A method of claim 1, wherein the PLA comprises a blend of poly(L-lactic acid) and poly(D-lactic acid) homopolymer, or a blend of PLA block copolymers where each block has an isomer purity of greater than 92% of L-lactic acid or D-lactic acid.

9. A method of claim 1, wherein the resin comprises a PLA copolymer, a PLA block copolymer, a PLA homopolymer or a blend of PLA with one or more other polymers.

10. A method of claim 1, wherein the impregnated resin is in the form of a particle, bead, rod, bar, sheet, film, moulded shape or extruded shape, wherein preferably the moulded shape comprises a clamshell, pot, box, bowl, cup, plate or tray.

11. A method of claim 1, wherein the resin further comprises one or more fillers, additives, nucleating agents, plasticisers or co-blowing agents, or any combination of any two or more thereof.

12. A method of claim 3, wherein the impregnation step, the holding step, or the impregnation step and the holding step are conducted at a temperature at or below the glass transition temperature of the resin.

13. A method of claim 1, wherein the impregnated resin further comprises one or more fillers, additives, nucleating agents, plasticisers or co-blowing agents, or any combination of any two or more thereof.

14. A method of claim 1, wherein the foam exhibits linear shrinkage of less than 5% when subjected to a compressive force of about 10 kPa and heated from room temperature up to 70° C. with a temperature increase of 2° C. per minute.

15. A method of claim 1, wherein the polylactic acid resin comprises at least about 94 to 99.9% by weight L- or D-lactic acid.

16. A method of claim 1, wherein the polylactic acid resin comprises at least about 95 to 99.9% by weight L- or D-lactic acid.

* * * * *